(12) United States Patent
Yuen et al.

(10) Patent No.: US 8,425,334 B2
(45) Date of Patent: Apr. 23, 2013

(54) LOW NOISE AND VIBRATION FLEXIBLE SHAFT

(75) Inventors: Tat M. Yuen, Old Bridge, NJ (US); Kunjal Oza, Highland Park, NJ (US)

(73) Assignee: S.S. White Technologies Inc., Piscataway, NJ (US)

( * ) Notice: Subject to any disclaimer, the term of this patent is extended or adjusted under 35 U.S.C. 154(b) by 68 days.

(21) Appl. No.: 13/187,565

(22) Filed: Jul. 21, 2011

(65) Prior Publication Data

US 2012/0021841 A1    Jan. 26, 2012

Related U.S. Application Data

(60) Provisional application No. 61/366,737, filed on Jul. 22, 2010.

(51) Int. Cl.
*F16C 1/08*    (2006.01)

(52) U.S. Cl.
USPC ................ 464/60; 156/184; 464/90

(58) Field of Classification Search ........... 464/52, 464/53, 89–91, 57–60; 74/502.6; 156/184, 156/187
See application file for complete search history.

(56) References Cited

U.S. PATENT DOCUMENTS

| 3,481,156 | A | * | 12/1969 | Decsipkes | ................ 464/52 |
| 4,787,878 | A | * | 11/1988 | Nikkel | ................ 464/89 X |
| 5,558,578 | A | | 9/1996 | Uryu et al. | |
| 7,717,795 | B2 | | 5/2010 | Mellor | |
| 2008/0220883 | A1 | | 9/2008 | Yuen | |
| 2009/0258722 | A1 | * | 10/2009 | Huang | ............ 156/187 X |
| 2010/0252359 | A1 | | 10/2010 | Yuen | |

FOREIGN PATENT DOCUMENTS

GB    2 019 529 A    * 10/1979

* cited by examiner

*Primary Examiner* — Gregory Binda
(74) *Attorney, Agent, or Firm* — Arthur L. Lessler

(57) ABSTRACT

A flexible shaft having square or helical square tips with thermoplastic felt covering and adherent to the tips including the tip ends. The felt has fused bulges adjacent the ends. When the tips are inserted into mating recesses of driving and driven members, the felt is deformed to improve the fit between the tips and the recesses and reduce noise and vibration when the driving member is rotated.

10 Claims, 6 Drawing Sheets

SECTION B-B

SECTION A-A

SECTION A-A

SECTION A-A

SECTION A-A

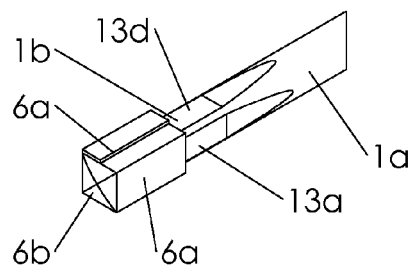
Fig 6a
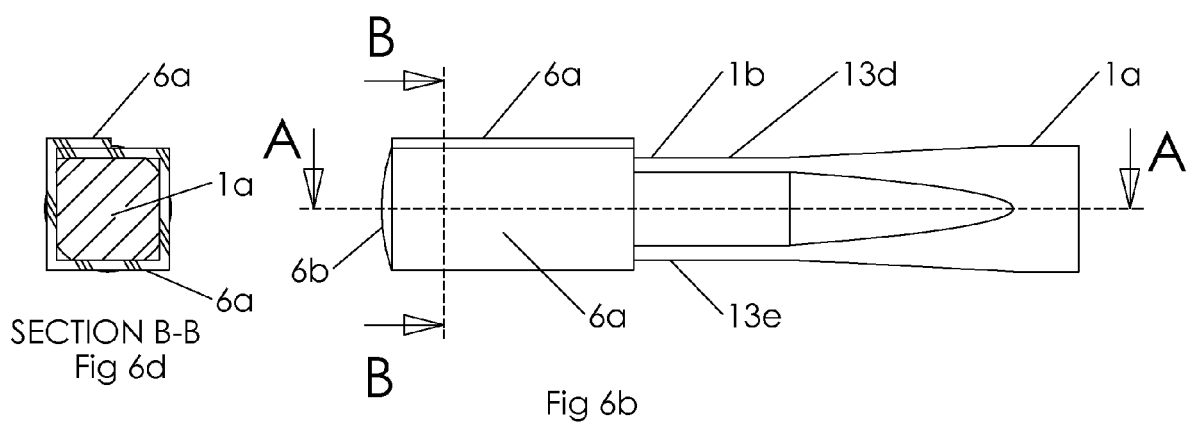
SECTION B-B
Fig 6d
Fig 6b
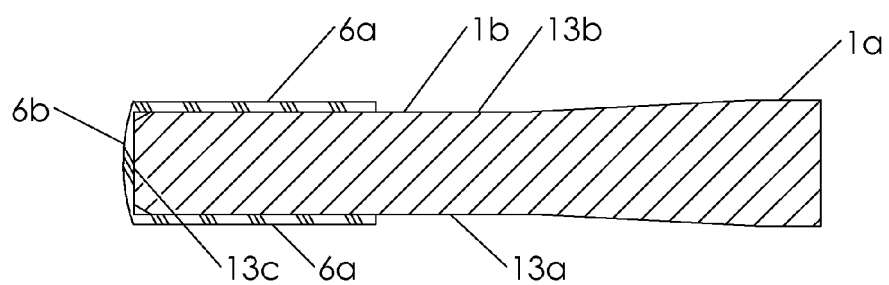
SECTION A-A
Fig 6c

LOW NOISE AND VIBRATION FLEXIBLE SHAFT

CROSS-REFERENCE TO RELATED APPLICATIONS

This application claims the benefit of U.S. Provisional Application Ser. No. 61/366,737 filed Jul. 22, 2010 and entitled Low Noise and Vibration Flexible Shaft Assembly.

BACKGROUND OF THE INVENTION

The present invention relates to a rotatable flexible shaft transmitting torque with reduced noise and vibration.

Such shafts normally have ends of square cross-section which are adapted to engage square recesses in mating torque transmitting and receiving members. When such a shaft is rotated, noise is generated due to movement of the shaft ends within the mating recesses. It is not possible to provide an exact fit between the shaft ends and the recesses, since manufacturing tolerances must be maintained to insure the ends can be inserted into the recesses when the associated devices, such as motor vehicle seats, are assembled.

Prior art efforts to reduce such noise and vibration include applying flocked yarn or flock fibers, grease, or heat shrink tubing such as polytetrafluoroethylene to the lateral surfaces of the shaft ends. See, for example, U.S. Pat. No. 7,717,795 to Mellor.

Such prior art constructions have various disadvantages such as significant manufacturing expense, fabrication difficulty, limited durability, limited useful life, and/or a performance level less than that desired.

Patent Application Publication No. US 2008/0220883 of Yuen shows a noise and vibration reducing construction wherein felt or a material having similar mechanical characteristics is wrapped around a major part of the shaft to reduce noise and vibration due to contact with the surrounding casing. U.S. Pat. No. 5,558,578 to Uryu et al. discloses compressed felt coaxial sheaths which surround spaced portions of the shaft. However, further reduction of noise and vibration is generally desired.

Patent Application Publication No. US 2010/0252359 of Yuen shows a noise reducing construction wherein the shaft ends have raised portions of compressible material such as flocked yarn covered with plastic tubing. This construction also fails to provide the desired level of durability, useful life, and noise and vibration reduction.

Accordingly, an object of the present invention is to provide an improved reduced noise and vibration flexible shaft which can readily be manufactured at reasonable cost and which exhibits improved durability and useful life.

SUMMARY OF THE INVENTION

According to the invention, a torque transmitting wire wound flexible shaft has noncircular end portions, preferably having a square or helical square shape and chamfered end portions. Felt strips are wrapped around and adhered to all or part of the end portions including the distal end surfaces thereof, and may be wrapped around all or part of the chamfered parts of those end portions. Overlapping parts of the felt strips are preferably fused together, in which case they are made of thermoplastic material.

IN THE DRAWING

FIG. 2b is a front elevation view of the shaft tip shown in FIG. 2a.

FIG. 3b is a front elevation view of the shaft tip shown in FIG. 3a.

FIG. 4b is a front elevation view of the shaft tip shown in FIG. 4a.

FIG. 5b is a front elevation view of the shaft tip shown in FIG. 5a.

FIG. 6a is an isometric view of a flexible shaft tip according to a fifth and preferred embodiment of the invention.

FIG. 6b is a front elevation view of the shaft tip shown in FIG. 6a.

FIG. 6c is a front cross-sectional view of the shaft tip shown in FIG. 6b, taken along the cutting plane A-A.

FIG. 6d is a left side cross-sectional view of the shaft tip shown in FIG. 6b, taken along the cutting plane B-B.

DETAILED DESCRIPTION

Figure 1:
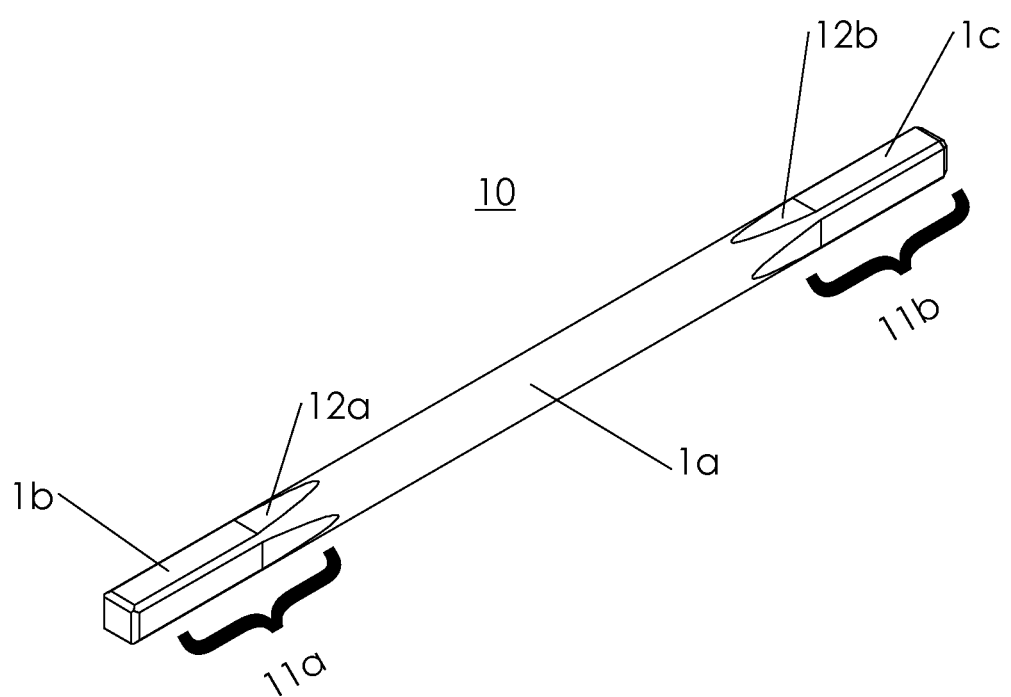
FIG. 1 is an isometric view of a flexible shaft according to a first embodiment of the invention.
Figure 2A:
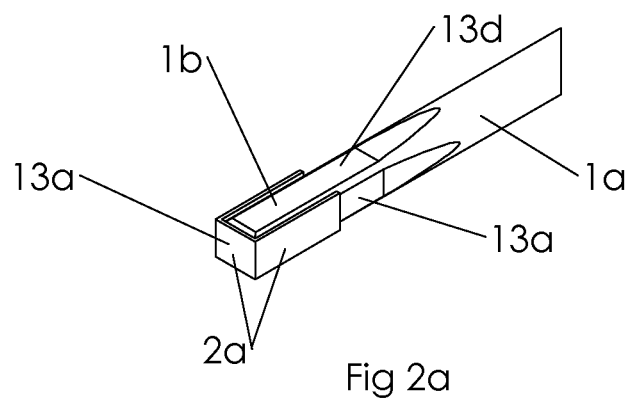
FIG. 2a is an isometric view of one tip of the shaft shown in FIG. 1.
Figure 2B:
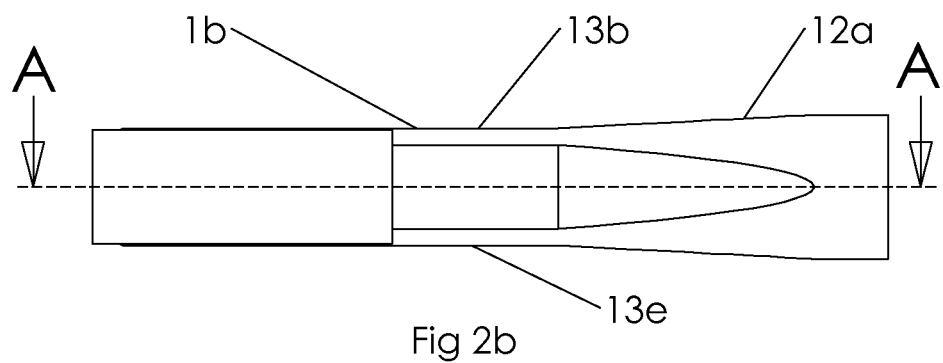
Figure 2C:
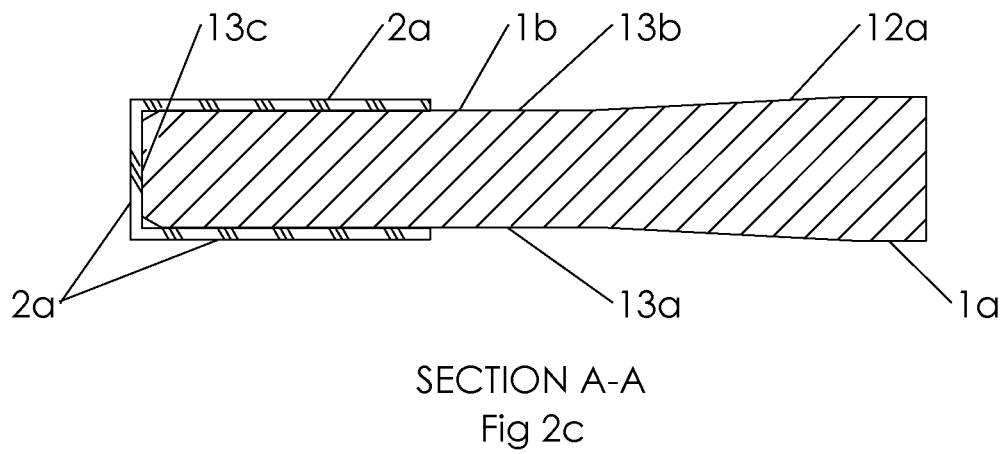
FIG. 2c is a front cross-sectional view of the shaft tip shown in FIG. 2b, taken along the cutting plane A-A.

The wire wound flexible shaft 10 shown in FIGS. 1 to 2c has a central generally cylindrical major portion 1a with noncircular end portions 11a and 11b which have tips 1b and 1c respectively of square cross-section and chamfered transition parts 12a and 12b between the tips and the major portion of the shaft.

The shaft tips may if desired have a helical square end shape such as that shown in U.S. Pat. No. 6,464,588 to Rupp. Both the square and helical square tip shapes have a square cross-section.

Alternatively, the tips may have other geometries such as generally conical, dome-shaped, or of complex shape, so long as they have a noncircular cross-section.

As best seen in FIGS. 2a and 2c, a single felt strip 2a covers part of the front and rear surfaces 13a and 13b of tip 1b as well as the tip end surface 13c.

The felt strip 2a preferably comprises a thermoplastic felt and is glues to the adjacent parts of the tip 1b. Alternatively, wool, a rayon-wool composite, or another felt material may be used.

The felt strip 2a should have a thickness and compressibility consistent with the manufacturing tolerance between the shaft tip and the mating recess of a driving or driven member into which the tip is to be inserted. When so inserted, the felt is compressed to accommodate, that is, partially fill the space between the tip and mating recess, resulting in reduced noise and vibration when the shaft is rotated.

While only one shaft tip is shown and described in detail, the opposite shaft tip of each embodiment is covered with felt to a similar extent and in a similar manner.

Figure 5A:
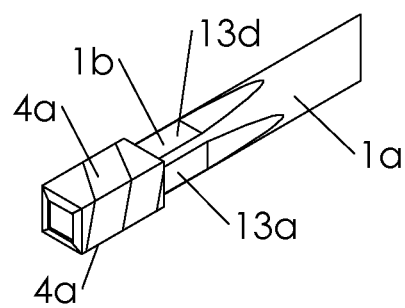
FIG. 5a is an isometric view of a flexible shaft tip according to a fourth embodiment of the invention.
Figure 5B:
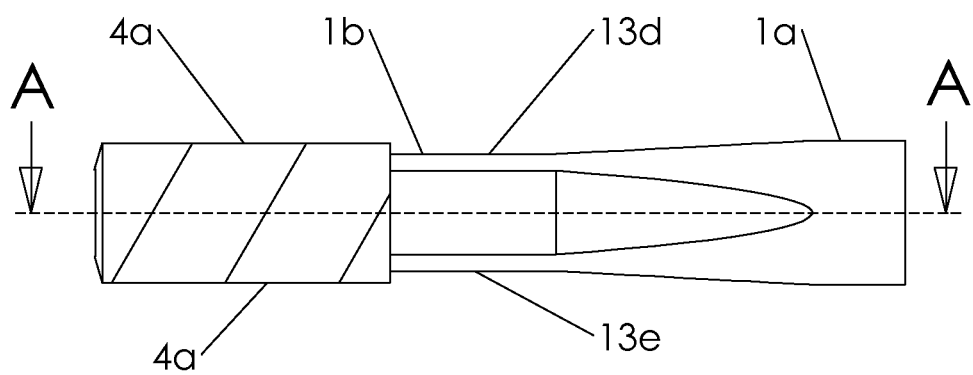
Figure 5C:
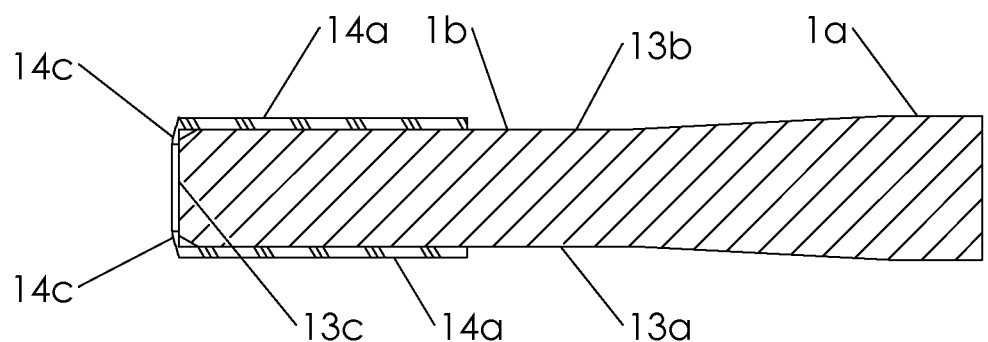
FIG. 5c is a front cross-sectional view of the shaft tip shown in FIG. 5b, taken along the cutting plane A-A.

In the first embodiment the upper and lower surfaces of the shaft tips are not covered; while in the other embodiments all four tip lateral surfaces are covered with felt. In the fourth embodiment (FIGS. 5a-5c) the ends of the shaft tips are only partially covered with felt, while in the other embodiments the ends are substantially fully covered.

Figure 3A:
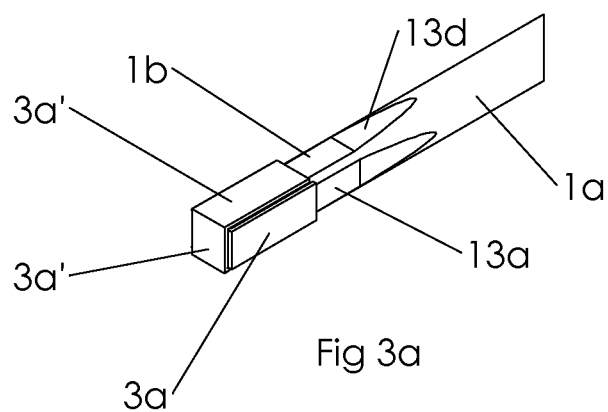
FIG. 3a is an isometric view of a flexible shaft tip according to a second embodiment of the invention.
Figure 3B:
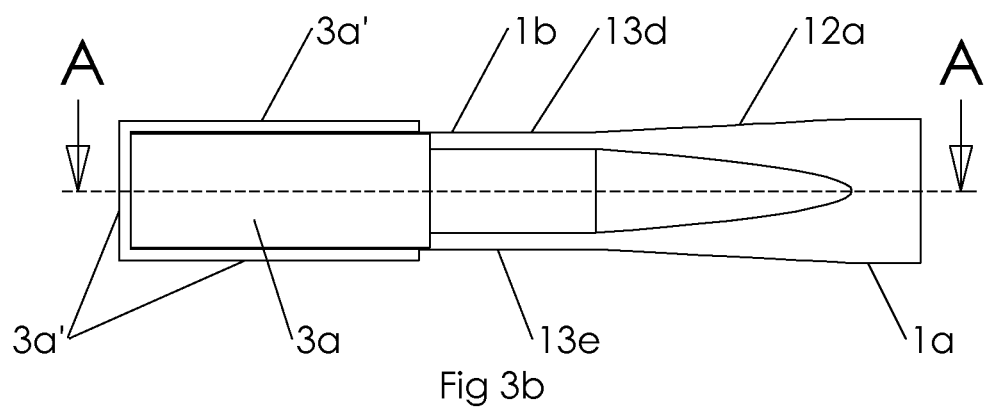
Figure 3C:
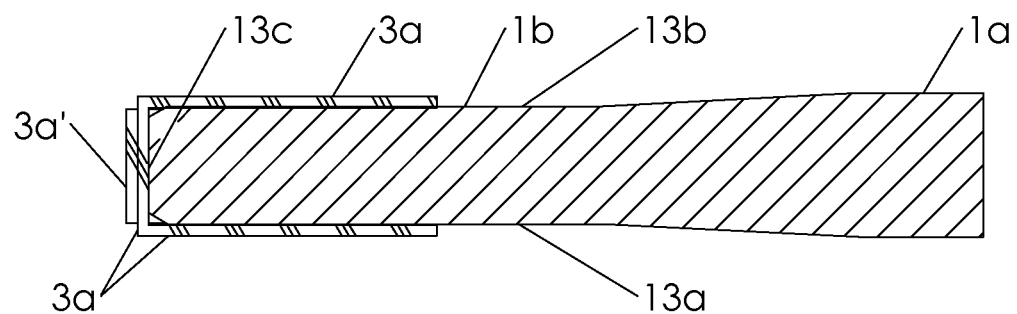
FIG. 3c is a front cross-sectional view of the shaft tip shown in FIG. 3b, taken along the cutting plane A-A.

In the second embodiment (FIGS. 3a-3c) two felt strips 3a and 3a' cover the tip 1b. Strip 3a covers part of the front and rear surfaces 13a and 13b of tip 1b as well as the tip end surface 13c; while strip 3a' covers part of the upper and lower surfaces 13d and 13e of tip 1b as well as the tip end surface 13c, where strip 3a' overlaps strip 3a.

Felt strips 3a and 3a' comprise a thermoplastic material and are glued to the adjacent surfaces of the tip 1b. After they are applied, a hot anvil is used to contact the overlapping parts of the strips at the tip end 13c, to cause those parts to fuse together.

Instead of using two strips to cover the tip end in the second embodiment, a single piece of felt having the shape of a cross can be used, with the center of the cross shape being applied to the tip end 13c and the arms covering the adjacent lateral surfaces 13a, 13b, 13d and 13e of the tip 1b.

Figure 4A:
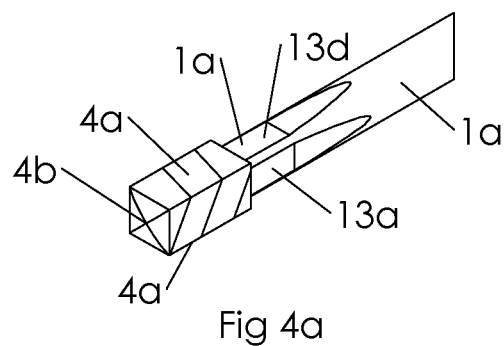
FIG. 4a is an isometric view of a flexible shaft tip according to a third embodiment of the invention.
Figure 4B:
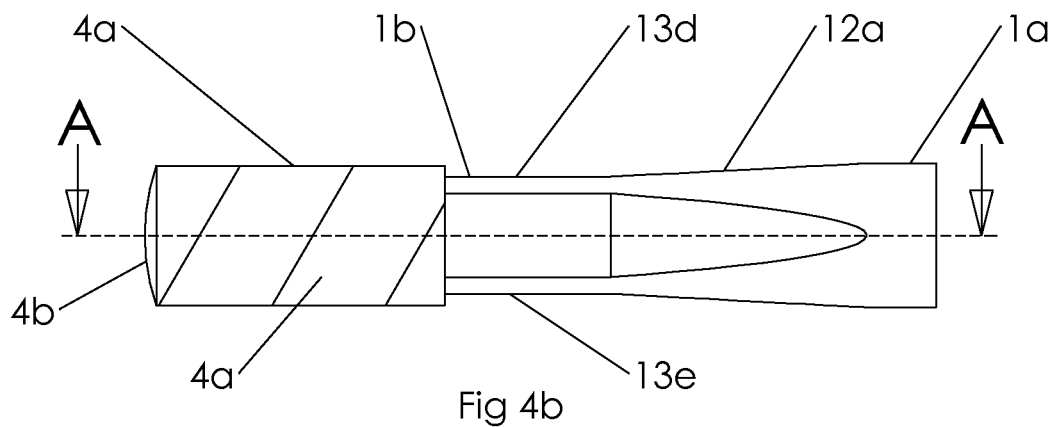
Figure 4C:
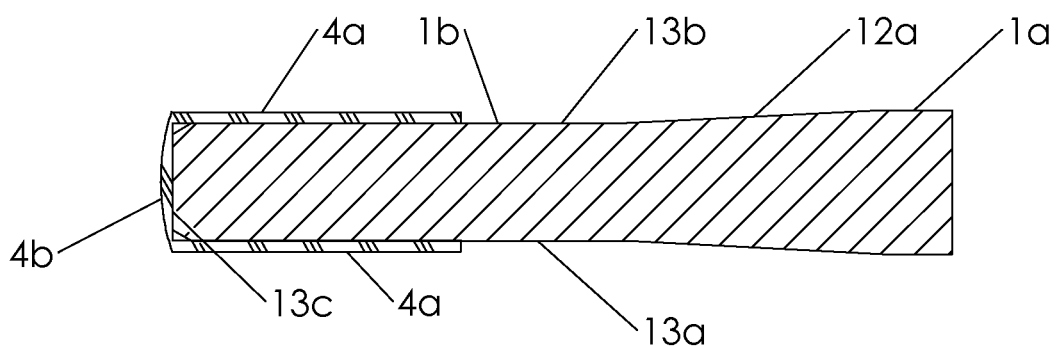
FIG. 4c is a front cross-sectional view of the shaft tip shown in FIG. 4b, taken along the cutting plane A-A.

In the third embodiment (FIGS. 4a-4c) thermoplastic felt tape 4a is helically wrapped around and glued to the end of the tip 1b in such a manner that adjacent turns are close to each other but do not overlap. The tape is overwound at the tip end 13c so that a small part of the tape extends beyond the tip end. The extending part of the tape is then contacted with a hot anvil to cause the extending part to fuse so as to form a fused felt bulge 4b on the tip end 13c.

The fourth embodiment (FIGS. 5a-5c) is the same as the fourth embodiment, except that the tape 4a is overwound by a smaller amount so that after fusing of its extending part, the resulting bulge 4c covers only a peripheral portion of the tip end, leaving a central part of the end exposed.

In the fifth and preferred embodiment (FIGS. 6a-6d) a single piece of thermoplastic felt 6a is wrapped around the tip 1b and overwound at the tip end 13c so that a small part of the tape extends beyond the tip end. The extending part of the tape is then contacted with a hot anvil to cause the extending part to fuse so as to form a fused felt bulge 6b on the tip end 13c.

The distal ends (not shown) are chamfered to facilitate insertion into mating recesses of driving and driven members of an associated device.

The felt strips or tape are secured to the adjacent surfaces of the shaft end portions by glue suitable for adhering the particular felt being used to the tip metal without saturating the felt.

If desired, the felt strips or tape may extend so far along the tips that part or all of the chamfered portions 12a are covered. Instead of felt, a similar compressible, vibration damping material may be used. The felt or similar material prevents rattle by filling the space between the shaft end portion and mating hole with compressible, vibration damping material which deforms upon engagement of the shaft end portion and hole to conform itself to that space.

We claim:

1. A torque transmitting wire wound flexible shaft having end portions with tips of noncircular cross-section, the lateral surfaces of the tips and the tip ends being covered with a layer of adherent compressible vibration absorbing material which overlaps itself, the overlapping parts of said layer being fused together.

2. A torque transmitting wire wound flexible shaft having end portions with tips of square cross-section,
   at least a part of at least two opposed tip surfaces and at least a part of the tip ends being covered with felt which is adherent thereto,
   the felt overlapping itself and overlapping portions thereof being fused together.

3. The shaft according to claim 2, wherein all four lateral surfaces of the portions of the tips adjacent their ends are covered with felt.

4. The shaft according to claim 3, wherein the felt comprises tape having an overwound part adjacent each tip end, each overwound part being fused to form a bulge at the corresponding tip end.

5. The shaft according to claim 2, wherein the felt comprises a thermoplastic material.

6. A torque transmitting wire wound flexible shaft having end portions with tips of square cross-section, the lateral surfaces of the tips being covered with thermoplastic felt which is wound thereon and adherent thereto, an overwound part of the felt comprising a fused bulge adjacent each tip end.

7. A torque transmitting wire wound flexible shaft having end portions with tips of square cross-section,
   all four lateral surfaces of the portions of the tips adjacent their ends being covered with felt which is adherent thereto,
   said felt comprising tape having an overwound part adjacent each tip end,
   each overwound part being fused to form a bulge at the corresponding tip end,
   the tape being helically wound on each tip.

8. In a method for manufacturing a wire wound flexible shaft having noncircular tips adjacent the distal ends thereof, the improvement comprising the steps of:
   winding a strip or tape comprising fusible compressible material around at least one tip so that an overwound part of the strip extends beyond the distal end of the tip;
   causing the strip or tape to adhere to the tip; and
   fusing the overwound part of the strip or tape to form a bulge covering at least a part of the distal end of the tip.

9. The improvement according to claim 8, wherein said material is thermoplastic.

10. The improvement according to claim 9, wherein said material is felt.

* * * * *